US005080381A

United States Patent [19]

Perez

[11] Patent Number: 5,080,381

[45] Date of Patent: Jan. 14, 1992

[54] TOOL TRAY WITH WHEELS

[76] Inventor: Benjamin Perez, 4073 W. 8ct., Hialeah, Fla. 33010

[21] Appl. No.: 562,973

[22] Filed: Aug. 6, 1990

[51] Int. Cl.[5] .............................................. B62B 11/00

[52] U.S. Cl. ....................................... 280/35; 108/116

[58] Field of Search ....................... 280/32.5, 32.6, 35, 280/87.021, 87.041, 47.34, 47.41, 79.11, 79.2, 79.3; 248/129, 161; 108/116

[56] References Cited

U.S. PATENT DOCUMENTS

| | | | |
|---|---|---|---|
| 2,572,780 | 10/1951 | Tackenberg | 280/33.998 |
| 2,872,252 | 2/1959 | Konkle | 280/32.5 |
| 4,632,410 | 12/1986 | Bainbridge et al. | 280/32.5 |
| 4,863,178 | 9/1989 | Friesen | 280/32.6 |

FOREIGN PATENT DOCUMENTS

| | | | |
|---|---|---|---|
| 38382 | 5/1931 | France | 280/79.4 |

*Primary Examiner*—Andres Kashnikow
*Assistant Examiner*—Richard Camby
*Attorney, Agent, or Firm*—J. Sanchelima

[57] ABSTRACT

A tool tray with wheels to be used by mechanics for under the hood work and comprising a horizontal base structural members with wheels and having a configuration that permits its proximity to the side of the car without damaging it and a telescopically extending vertical assembly having an arm assembly pivotally mounted at its upper end. The arm assembly includes a tray member that slidably and radially travels towards and away from the axis of the telescopically extending vertical assembly. Electrical and compressed air conduits are provided connectors and made available to the user in the arm assembly area to provide the necessary power to conventional tools. Also, an electrical lamp with a flexible supporting arm is provided.

5 Claims, 1 Drawing Sheet

TOOL TRAY WITH WHEELS

BACKGROUND OF THE INVENTION

1. Field of the Invention

The present invention relates to tool trays for the repair of automobiles and other vehicles, and more particularly, to those trays that includes wheels on the lower ends.

2. Description of the Related Art

On of the problems faced by the modern mechanic is that a number of tools are available for the different parts of an engine that require his constant interruption and trips to the tool box. This is particularly annoying when a mechanic is working under the hood of a vehicle. Not infrequently the mechanism requires a helper to provide him these tools. Another problem is that the handling of these tools over the cars hood makes the finish in these vehicles susceptible to scratches. The trays available at the present time fail to provide an effective solution to the mechanic.

Applicant believes that the closest reference corresponds to U.S. Pat. No. 2,572,780 issued to Takenburg on Oct. 23, 1951. However, it differs from the present invention because his cart has wheels and it is not practical for transportation of vehicle tools and it was certainly designed for a different purpose.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a tray that is capable of bringing within a mechanics easy reach most of the tools and utensil utilized in the trade.

It is another object of this present invention to provide such a tray that has a configuration that is easily adaptable to most automobile designs.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
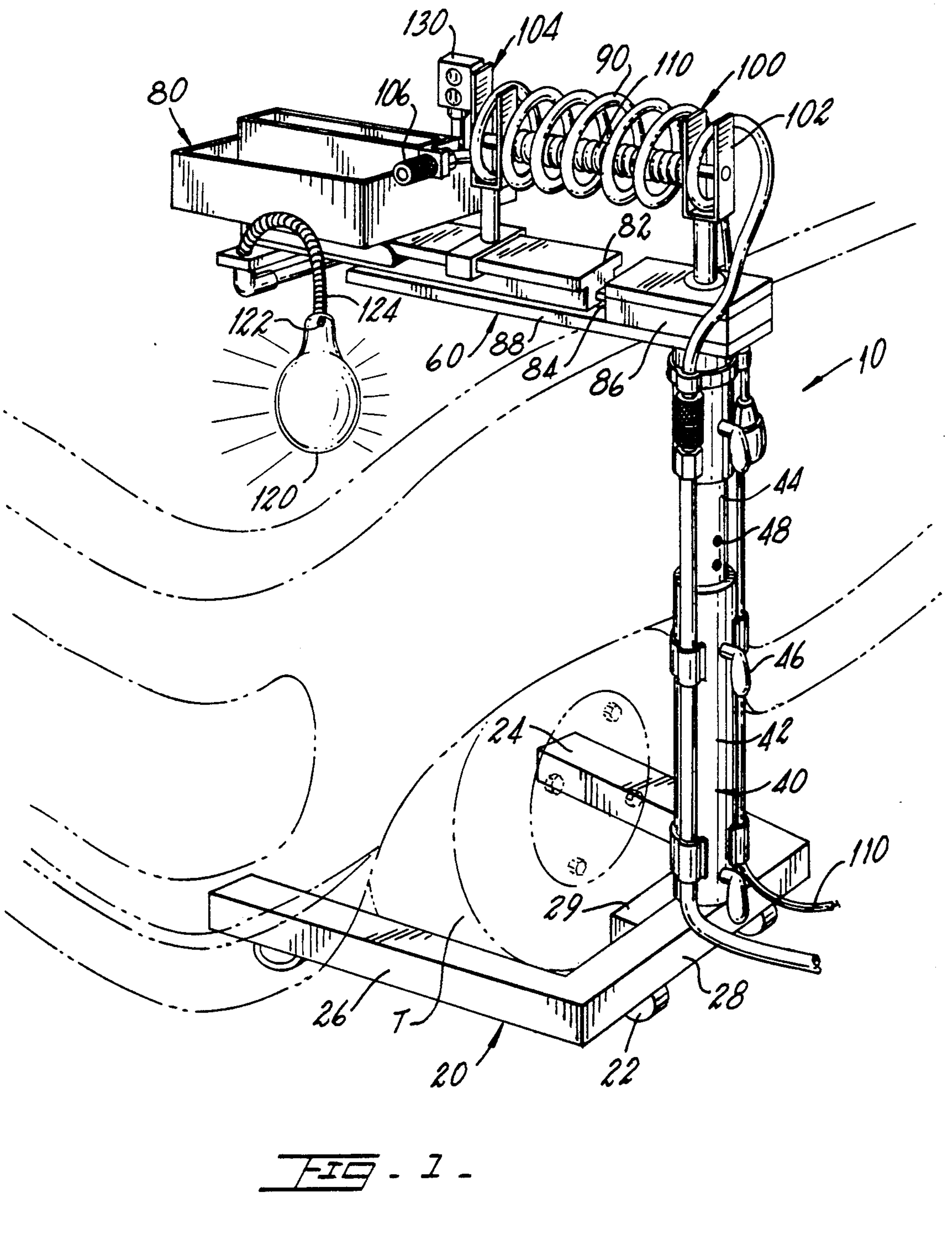
FIG. 1 represents the present invention, in perspective, and being utilized in the repair of a typical vehicle.

Referring now to FIG. 1, where the present invention is generally referred to with numeral 10, it can be observed that it basically includes a wheeled base assembly 20, telescopically extending vertical assembly 40 and telescopically extending horizontal arm 60. Wheeled base assembly 20 includes roller members 22 that are readily mounted to bottom surface of wheeled base assembly 20. Base assembly 20 includes horizontal structural members 24 and 26 which are kept in a spaced apart relationship by horizontal connecting structural member 28. Members 24 and 26 are not parallel with respect to each other along respective longitudinal axes. Members 24 and 26 slightly diverts from each other more at the ends not connected to connecting structural member 28 so that they can substantially clear tire T and permit tray 10 to reach closer to the areas where a user is working on. Stopper member 29 prevents any contact between tray 10 and the body of the vehicle being worked on.

Telescopically extending vertical assembly 40 includes, in the preferred embodiment, lower cylindrical assembly 42 coaxially and cooperative upper cylindrical assembly 44. Assemblies 42 and 44 are locked in place relative to each other by pin member 46 and openings 48 thereby providing the necessary height for arm assembly 60.

Arm assembly 60 is pivotally mounted to the upper end of telescopically extending vertical assembly 40 so that the former can rotate within a horizontal plane and around the axis for telescopically extending vertical assembly 40. Assembly 60 includes tray member 80 of suitable dimensions and configuration to house the most common tools used by a mechanic, such as, screwdrivers, hammers, wrench, etc. Tray member 80 is mounted to sliding platform assembly 82 so that the former can extend radially outwardly from vertical assembly 40. Also, compressed air conduit 90 is wound on compressed air hose assembly 100 that in turn is composed of a fixed post 102 and moving post 104. Moving post 104 is mounted to slidable platform 82. The connector 106 at the end of conduit 90 is rigidly mounted to tray member 80 in the preferred embodiment. Electrical conduit 110 is routed up along vertical assembly 40 and then helically and stretchably wound preferably inside coiled conduit 90 to provide the necessary electrical power for lamp 120 which includes a switch 122. AC outlet 130 electrically connected to conduit 90 is provided to cover any additional electrical power needs from conventional power tools.

Sliding platform assembly 82 is slidably mounted over guiding rail 84 which in turn is rigidly mounted on fixed platform member 86 and to horizontal support assembly 88. Moving post 104 is rigidly mounted to sliding platform 82, in the preferred embodiment.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A tool tray assembly for use in connection with the repair and maintenance of vehicles with wheels, comprising:

A. horizontal base means having a bottom surface including two horizontal structural members that are positioned in the same plane, not parallel with respect to each other along their longitudinal axis, and one connecting horizontal member rigidly attached to said two horizontal structural members so that the latter extend away from each other at the distal ends a sufficient distance to permit the positioning of said vehicle wheels between them, and said horizontal base means further including wheel means mounted to said bottom surface;

B. telescopically extending vertical structural means, having upper and lower ends, and said lower end being perpendicularly and rigidly mounted to said horizontal base means;

C. tray means mounted to said upper end of said telecopically extending vertical structural means; and D. compressed air conduit means attached to said tool tray, extending to said tray means and having an outlet connector mounted thereon.

2. The tool tray assembly set forth in claim 1, further including:

E. electrical conduit means attached to said tool tray assembly and having electrical outlet means electrically connected to said electrical conduit means.

3. The tool tray assembly set forth in claim 2, wherein said tray means includes an arm assembly that is pivotally mounted to said upper end of said telescopically extending vertical structural means and said arm assembly is capable of rotating in a plane that is perpendicular to the longitudinal axis of said telescopically extending vertical structural means.

4. The tool tray assembly set forth in claim 3 wherein said arm assembly includes moving platform means slidably mounted thereon for radial movement thereof and said moving platform further including post means rigidly mounted thereon for supporting said outlet connector and electrical outlet means.

5. The tool tray assembly set forth in claim 4 wherein said tray means further include electrical lamp means mounted thereon and connected to said electrical conduit.

* * * * *